(12) United States Patent
Hamad et al.

(10) Patent No.: US 10,598,100 B2
(45) Date of Patent: *Mar. 24, 2020

(54) HEAT EXCHANGER CONFIGURATION FOR ADSORPTION-BASED ONBOARD OCTANE ON-DEMAND AND CETANE ON-DEMAND

(71) Applicant: Saudi Arabian Oil Company, Dhahran (SA)

(72) Inventors: Esam Zaki Hamad, Dhahran (SA); Eman AbdelHakim A. M. Tora, Faisal (EG); Amer A. Amer, Dhahran (SA); Junseok Chang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,870

(22) Filed: Jun. 26, 2019

(65) Prior Publication Data

US 2019/0316531 A1  Oct. 17, 2019

Related U.S. Application Data

(63) Continuation of application No. 15/885,084, filed on Jan. 31, 2018, now Pat. No. 10,378,462.

(51) Int. Cl.
*F02G 5/00* (2006.01)
*F02D 19/06* (2006.01)
(Continued)

(52) U.S. Cl.
CPC ..... *F02D 19/0671* (2013.01); *B01D 53/0407* (2013.01); *B01D 53/0454* (2013.01);
(Continued)

(58) Field of Classification Search
CPC ...... F02M 31/02; F02M 31/04; F02M 31/125; F02M 25/08; F02M 25/0836; F02D 2250/02
(Continued)

(56) References Cited

U.S. PATENT DOCUMENTS 3,985,108 A  10/1976 Matsumoto et al.
4,212,276 A  7/1980 Kaneda
(Continued)

FOREIGN PATENT DOCUMENTS

CN  102399602 A  4/2012
CN  202226834 U  5/2012
(Continued)

OTHER PUBLICATIONS

Setty, Varadaraja, B.E., "The Effect of Oxygen-Enriched Air on the Performance and Exhaust Emissions of Internal Combution Engines", A Thesis submitted to the Graduate Faculty of Texas Tech University; May 1993.
(Continued)

*Primary Examiner* — John Kwon
(74) *Attorney, Agent, or Firm* — Dinsmore & Shohl, LLP

(57) ABSTRACT

A vehicular propulsion system, a vehicular fuel system and a method of operating an internal combustion engine. A separation unit that makes up a part of the fuel system includes one or more adsorbent-based chambers such that the separation unit may selectively receive and separate at least a portion of onboard fuel into octane-enhanced and cetane-enhanced fuel components. A supply tank includes three compartments where the first contains the onboard fuel, the second receives a vaporized adsorbate from the separation unit and condenses at least a part of it into one of an octane-rich fuel component or a cetane-rich fuel component, while the third may either store the condensed and enriched fuel component or help condense more of the vaporized adsorbate. The condensing takes place through heat exchange between the onboard fuel and the vaporized adsorbate that are present within the various compartments of the supply tank. A controller may be used to determine a particular operational condition of the internal combustion
(Continued)

engine such that the onboard fuel can be sent to one or more combustion chambers within the internal combustion engine without first passing through the separation unit, or instead to the separation unit in situations where the internal combustion engine may require an octane-rich or cetane-rich mixture.

17 Claims, 5 Drawing Sheets

(51) Int. Cl.
| | |
|---|---|
| F02M 31/18 | (2006.01) |
| F02M 37/00 | (2006.01) |
| F02D 41/06 | (2006.01) |
| F02D 41/38 | (2006.01) |
| B01D 53/04 | (2006.01) |
| F02M 31/20 | (2006.01) |
| F02D 41/00 | (2006.01) |
| F02M 25/08 | (2006.01) |
| F02D 19/08 | (2006.01) |
| F02M 27/02 | (2006.01) |
| B60K 15/03 | (2006.01) |
| B60T 7/12 | (2006.01) |
| B60K 15/035 | (2006.01) |

(52) U.S. Cl.
CPC .......... *B60K 15/03* (2013.01); *F02D 19/0615* (2013.01); *F02D 19/0649* (2013.01); *F02D 19/0665* (2013.01); *F02D 19/081* (2013.01); *F02D 41/0025* (2013.01); *F02D 41/06* (2013.01); *F02D 41/38* (2013.01); *F02M 25/08* (2013.01); *F02M 27/02* (2013.01); *F02M 31/18* (2013.01); *F02M 31/20* (2013.01); *F02M 37/0064* (2013.01); *F02M 37/0082* (2013.01); *F02M 37/0088* (2013.01); *B01D 2253/102* (2013.01); *B01D 2253/104* (2013.01); *B01D 2253/108* (2013.01); *B01D 2253/204* (2013.01); *B60K 2015/03105* (2013.01); *B60K 2015/03414* (2013.01); *B60K 2015/03514* (2013.01); *F02D 2200/021* (2013.01); *F02D 2200/06* (2013.01)

(58) Field of Classification Search
USPC ........ 123/516–520, 543, 545, 557, 575, 585
See application file for complete search history.

(56) References Cited

U.S. PATENT DOCUMENTS

| | | | |
|---|---|---|---|
| 4,308,841 A | 1/1982 | Kingsley | |
| 4,963,745 A | 10/1990 | Maggard | |
| 5,018,645 A | 5/1991 | Zinsmeyer | |
| 5,132,486 A | 7/1992 | Wylie | |
| 5,357,908 A | 10/1994 | Sung et al. | |
| 5,649,517 A | 7/1997 | Poola et al. | |
| 5,794,601 A | 8/1998 | Pantone | |
| 5,921,263 A | 7/1999 | Negley, III | |
| 5,979,705 A | 11/1999 | Kaehler et al. | |
| 6,055,808 A | 5/2000 | Poola et al. | |
| 6,067,973 A | 5/2000 | Chanda et al. | |
| 6,112,134 A | 8/2000 | Terranova et al. | |
| 6,119,637 A | 9/2000 | Matthews et al. | |
| 6,161,060 A | 12/2000 | Collins | |
| 6,163,738 A | 12/2000 | Miller | |
| 6,173,567 B1 | 1/2001 | Poola et al. | |
| 6,230,693 B1 | 5/2001 | Meiller et al. | |
| 6,332,448 B1 | 12/2001 | Ilyama et al. | |
| 6,352,068 B1 | 3/2002 | Jacobsen | |
| 6,380,859 B1 | 4/2002 | Brownlee | |
| 6,422,465 B2 | 7/2002 | Miller | |
| 6,494,192 B1 | 12/2002 | Capshaw et al. | |
| 6,505,134 B2 | 1/2003 | Poleshuk et al. | |
| 6,543,687 B2 | 4/2003 | Negley et al. | |
| 6,742,507 B2 | 6/2004 | Keefer et al. | |
| 6,972,093 B2 | 12/2005 | Partridge et al. | |
| 7,032,629 B1 | 4/2006 | Mattingly et al. | |
| 7,100,543 B2 | 9/2006 | Davidson | |
| 7,370,610 B2 | 5/2008 | Ashford et al. | |
| 7,377,272 B2 | 5/2008 | Davidson | |
| 7,455,046 B2 | 11/2008 | Biruduganti et al. | |
| 7,459,592 B2 | 12/2008 | Wolf et al. | |
| 7,523,770 B2 | 4/2009 | Horowitz et al. | |
| 7,900,607 B2 | 3/2011 | Lang et al. | |
| 7,954,478 B1 | 6/2011 | Schechter | |
| 7,958,872 B1 | 6/2011 | Schechter | |
| 8,046,984 B1 | 11/2011 | Schechter | |
| 8,051,828 B2 | 11/2011 | Sengupta et al. | |
| 8,118,009 B2 | 2/2012 | Pursifull et al. | |
| 8,141,356 B2 | 3/2012 | Leone et al. | |
| 8,211,300 B2 | 7/2012 | Partridge et al. | |
| 8,258,363 B2 | 9/2012 | Kalakkunnath et al. | |
| 8,375,899 B2 | 2/2013 | Leone et al. | |
| 8,459,238 B2 | 6/2013 | Pursifull et al. | |
| 8,506,656 B1 | 8/2013 | Turocy | |
| 8,580,111 B2 | 11/2013 | Partridge et al. | |
| 8,656,869 B2 | 2/2014 | Leone et al. | |
| 8,991,358 B2 | 3/2015 | Gehrke | |
| 9,422,147 B2 | 8/2016 | Bartlett et al. | |
| 9,776,624 B1 | 10/2017 | Leone et al. | |
| 9,802,810 B2 | 10/2017 | Johnson et al. | |
| 10,260,015 B2 | 4/2019 | Gosling et al. | |
| 10,378,462 B1* | 8/2019 | Hamad | F02D 19/0671 |
| 2002/0152999 A1 | 10/2002 | Holder et al. | |
| 2005/0055874 A1 | 3/2005 | Bekemeyer | |
| 2005/0066576 A1 | 3/2005 | Morris et al. | |
| 2005/0222748 A1 | 10/2005 | Naik et al. | |
| 2006/0009670 A1 | 1/2006 | Briot et al. | |
| 2006/0037589 A1 | 2/2006 | Gupta et al. | |
| 2007/0107676 A1 | 5/2007 | Davidson | |
| 2007/0113541 A1* | 5/2007 | Jankovic | F02B 11/00 60/285 |
| 2007/0113546 A1* | 5/2007 | Jankovic | F01N 3/00 60/287 |
| 2007/0157901 A1* | 7/2007 | Caine | F01L 1/25 123/302 |
| 2007/0256665 A1 | 11/2007 | Sun et al. | |
| 2008/0041226 A1 | 2/2008 | Hiltzik et al. | |
| 2008/0196695 A1 | 8/2008 | Storhok et al. | |
| 2008/0202118 A1 | 8/2008 | Ide et al. | |
| 2008/0308073 A1 | 12/2008 | Allen et al. | |
| 2008/0308074 A1 | 12/2008 | Allen et al. | |
| 2008/0308075 A1 | 12/2008 | Allen et al. | |
| 2009/0165759 A1 | 7/2009 | Sengupta et al. | |
| 2009/0165760 A1* | 7/2009 | Buttery | C10L 1/026 123/575 |
| 2009/0255875 A1 | 10/2009 | Unger et al. | |
| 2011/0023841 A1 | 2/2011 | Ucke et al. | |
| 2012/0006504 A1 | 1/2012 | Sugiura | |
| 2012/0031812 A1 | 2/2012 | Paggi | |
| 2012/0192834 A1 | 8/2012 | Tonery | |
| 2013/0014731 A1 | 1/2013 | Pursifull et al. | |
| 2013/0168311 A1 | 7/2013 | Johnson et al. | |
| 2013/0213349 A1 | 8/2013 | Sellnau et al. | |
| 2013/0255493 A1 | 10/2013 | Gupta | |
| 2013/0269521 A1 | 10/2013 | Nishita et al. | |
| 2013/0289850 A1 | 10/2013 | Johnson et al. | |
| 2015/0114362 A1 | 4/2015 | Costa-Patry et al. | |
| 2015/0353853 A1 | 12/2015 | Iwashita et al. | |
| 2016/0076492 A1 | 3/2016 | Leone et al. | |
| 2016/0265493 A1 | 9/2016 | Bima | |
| 2016/0313171 A1 | 10/2016 | Dudar et al. | |
| 2016/0368373 A1 | 12/2016 | Dudar et al. | |
| 2017/0067415 A1* | 3/2017 | Cai | F02M 25/0854 |
| 2017/0122668 A1 | 5/2017 | Fujii et al. | |
| 2017/0211532 A1 | 7/2017 | Yamauchi et al. | |

(56) References Cited

U.S. PATENT DOCUMENTS

2017/0234276 A1 8/2017 Hamad et al.
2019/0234320 A1* 8/2019 Hamad .............. F02M 37/0082

FOREIGN PATENT DOCUMENTS

| | | | |
|---|---|---|---|
| CN | 103045285 | A | 4/2013 |
| DE | 102004049218 | A1 | 4/2006 |
| EP | 1057988 | A2 | 12/2000 |
| JP | 2004231296 | A | 8/2004 |
| JP | 2004277016 | A | 10/2004 |
| JP | 2010163901 | A | 7/2010 |
| WO | 2011007121 | A2 | 1/2011 |
| WO | 2017014976 | A1 | 1/2017 |

OTHER PUBLICATIONS

"Different Strokes Infiniti Articulates Its Case for Variable Compression""www.roadandtrack.comPublished: Feb. 2017".
International Search Report pertaining to Application No. PCT/US2018/023962 dated Aug. 6, 2018.
"International Search Report and Written Opinion pertaining to International Application PCT/US2018/054182, Dec. 19, 2018, 14 pages."
U.S. Office Action pertaining to U.S. Appl. No. 15/885,084 dated Jan. 2, 2019, 20 pages.
Notice of Allowance dated Apr. 11, 2019 pertaining to U.S. Appl. No. 15/885,084, filed Jan. 31, 2018, 13 pgs.
Notice of Allowance dated May 1, 2019 pertaining to U.S. Appl. No. 15/939,971, filed Mar. 29, 2018, 32 pgs.
Notice of Allowance dated May 13, 2019 pertaining to U.S. Appl. No. 15/939,930, filed Mar. 29, 2018, 32 pgs.
Notice of Allowance dated Mar. 11, 2019 pertaining to U.S. Appl. No. 15/475,383, filed Mar. 31, 2017, 23 pgs.
Notice of Allowability dated May 13, 2019 pertaining to U.S. Appl. No. 15/475,383, filed Mar. 31, 2017, 7 pgs.
International Search Report and Written Opinion dated May 6, 2019 pertaining to International application No. PCT/US2019/015330 filed Jan. 28, 2019.
International Search Report and Written Opinion dated May 15, 2019 pertaining to International application No. PCT/US2019/015349 filed Jan. 28, 2019, 13 pgs.
International Search Report and Written Opinion dated Jun. 26, 2019 pertaining to International application No. PCT/US2019/021987 filed Mar. 13, 2019.

* cited by examiner

HEAT EXCHANGER CONFIGURATION FOR ADSORPTION-BASED ONBOARD OCTANE ON-DEMAND AND CETANE ON-DEMAND

CROSS-REFERENCE TO RELATED APPLICATION

This application is a continuation application of U.S. patent application Ser. No. 15/885,084 filed Jan. 31, 2018, the entire disclosure of which is hereby incorporated herein by reference.

BACKGROUND

The present disclosure relates generally to a vehicular fuel system for selectively separating an onboard fuel into octane-rich and cetane-rich components, and more particularly to such a system that promotes heat balance as part of such onboard fuel separation in such a way to reduce the size, weight and complexity associated with such fuel separation activities.

SUMMARY

Within the realm of internal combustion engines (ICEs) used for vehicular propulsion, it is the four-cycle variant (with its intake, compression, combustion and exhaust strokes) that is most commonly in use, where the combustion is typically achieved through either a spark ignition (SI) or compression ignition (CI) mode of operation. In SI-based modes, a mixture of air and fuel (typically octane-rich gasoline) is introduced into a combustion chamber for compression and subsequent ignition via spark plug. In CI-based engines, fuel (typically cetane-rich diesel fuel) is introduced into the combustion chamber where the air is already present in a highly compressed form such that the elevated temperature within the chamber that accompanies the increased pressure causes the fuel to auto-ignite. Of the two, the CI mode tends to operate with greater efficiency, while the SI mode tends to operate with lower emissions.

Various engine concepts or configurations may mimic the relatively low emissions of an SI mode of operation while simultaneously satisfying the high efficiency operation of a CI mode of operation. Such concepts go by various names, and include gasoline direct injection compression ignition (GDCI), homogenous charge compression ignition (HCCI), reactivity controlled compression ignition (RCCI), as well as others. In one form, a single fuel may be used, while in others, multiple fuels of differing reactivities, usually in the form of selective octane-enrichment or cetane-enrichment, may be introduced. While performing octane on demand (OOD) or cetane on demand (COD) as a way of fueling these engines is possible, such activities may be fraught with problems. For example, having the respective octane-enriched or cetane-enriched portions be in either pre-separated form involves the parallel use of at least two onboard storage tanks and associated delivery conduit. In addition, the time and complexity associated with vehicle refueling activity in this circumstance renders the possibility of operator error significant. Likewise, OOD or COD generation once the single market fuel is already onboard may require distillation or membrane-based permeation-evaporation (pervaporation) activities that are accompanied by significant increases in size, weight and overall complexity of the onboard fuel-reforming infrastructure. These difficulties are particularly acute as they relate to achieving a heat balance associated with the underlying fuel enrichment activities. As such, a simplified approach to integrating such infrastructure into an onboard fuel separation system is warranted.

According to one embodiment of the present disclosure, a vehicular propulsion system is disclosed. The propulsion system includes an ICE with a combustion chamber, as well as a fuel system for converting an onboard fuel into octane-rich and cetane-rich fuel components. The fuel system includes a fuel supply tank (also referred to as an onboard fuel tank or main tank) for containing the onboard fuel, a separation unit, a product tank and fuel conduit. The separation unit includes one or more adsorbent-based chambers each to selectively receive and separate at least a portion of an onboard fuel into an adsorbate and a remainder. The product tank may selectively receive and contain the remainder as a cetane-rich fuel component. The fuel supply tank includes first, second and third compartments such that together they help the fuel supply tank also act as a compact heat exchanger. The first compartment is used to contain the onboard fuel. The second compartment is disposed within the first compartment and may receive a vaporized form of the adsorbate from the separation unit. In this way, at least some of the vaporized form of the adsorbate that is present in the second compartment is condensed into an octane-rich fuel component through the thermal communication and consequent exchange of heat with the onboard fuel that is present in the first compartment. The third compartment is disposed within the second compartment and is both fluidly and thermally coupled to the second compartment; in this way, at least a portion of any remaining vaporized form of the adsorbate from the second compartment may be conveyed to the third compartment for at least one of storage and additional condensing into more of the octane-rich fuel component. Fuel conduit is used to establish fluid communication between various components that make up the fuel system so that at least one of the onboard fuel, the octane-rich fuel component and the cetane-rich fuel component may be conveyed to the combustion chamber from at least one of the separation unit, fuel supply tank and product tank.

According to another embodiment of the present disclosure, a vehicular fuel system for converting an onboard fuel into octane-rich and cetane-rich components is disclosed. The fuel system includes a fuel supply tank, conduit, a separation unit and a product tank. The fuel supply tank includes a first compartment for containing the onboard fuel, a second compartment and a third compartment in a manner similar to that of the previous embodiment where the various compartments exhibit one or both of thermal and fluid communication with one another in order to promote the formation of the adsorbate into a suitable octane-rich fuel component or cetane-rich fuel component in such a way that minimizes or avoids the use of redundant structure.

According to yet another embodiment of the present disclosure, a method of operating an internal combustion engine is disclosed. The method includes configuring a fuel system to have a heat-exchanger-based onboard fuel supply tank, a separation unit, a separate heat exchanger, a first product tank and a second product tank, as well as fuel conduit. A controller provides directions to at least some of the other components so that the controller can ascertain an operational condition of the internal combustion engine and then direct the flow of a portion of the onboard fuel to either the combustion chamber of the engine or to the separation unit depending on the engine operational condition. In a first ascertained engine condition, the onboard fuel flow does not interact with the separation unit, instead going to the combustion chamber for immediate use by the engine. In a second ascertained engine condition, the onboard fuel flow interacts with the separation unit such that an adsorbent portion of the onboard fuel collects on a surface of at least one of a plurality of chambers of the separation unit, while a remainder portion that is not adsorbed is routed to a storage tank. The heat exchange features of the onboard fuel supply tank include a first compartment, second compartment and third compartment in a manner similar to that of the previous embodiments such that an adsorbate that has been vaporized (that is to say, desorbed) by the operation of the separation unit may be condensed into a usable fuel component.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the present disclosure, an adsorption-based separation system may be used to split an onboard fuel into OOD or COD streams by taking advantage of one of two specific mechanisms: (1) employing differing functional groups that attract specific adsorbates (such as aromatics, cyclic and optional oxygenates) that are present in the onboard fuel supply; and (2) using a molecular sieve to selectively pass certain smaller (that is to say, linear) molecules while retaining larger (that is to say, branched) ones. Examples of the first type of adsorbent include activated carbon, silica, and alumina, as well as some types of zeolites and functionalized porous material in general, while examples of the second type include zeolites, metal organic frameworks and structured porous material. Within the present context, a fuel is deemed to be octane-rich when it has a concentration of iso-octane (2,2,4-trimethylpentane, $C_8H_{18}$) or equivalent anti-knocking agent that is greater than that of the readily-available market fuel from which one or more separation activities have been employed. By way of example, a fuel would be considered to be octane-rich if it had a research octane number (RON) of greater than about 91-92 or an anti-knock index (AKI) of greater than about 85-87 for a so-called regular grade unleaded fuel, with respectively slightly higher values for mid-grade unleaded fuel and premium unleaded fuel. Within the present context, it will be understood that there are regional variations in the values of RON, AKI or other octane or cetane indicia, and that the ones expressly discussed in the previous sentence contemplate a United States market. Nevertheless, such values will be understood to be suitably adjusted to take into consideration these regional variations, and that all such values are deemed to be within the scope of the present disclosure within their respective region, country or related jurisdiction. As with octane, a fuel is deemed to be cetane-rich when it has a concentration of n-cetane (n-hexadecane) ($C_{16}H_{34}$) or components with equivalent ignition delay characteristics that is greater than that of readily-available market fuels. By way of example, a fuel would be considered to be cetane-rich if it had a cetane number (CN) of greater than about 40-45 (for most of the United States market, with suitable variations elsewhere).

Figure 1:
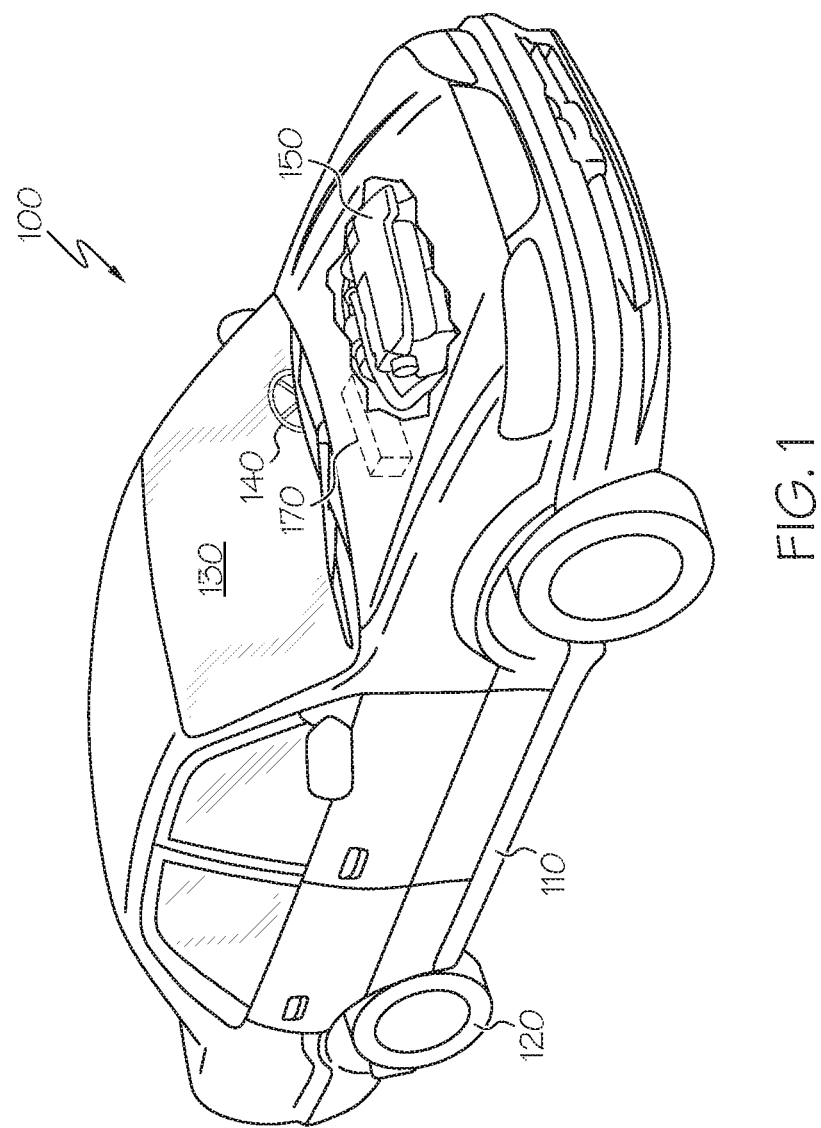
FIG. 1 shows a vehicle with a partial cutaway view of an engine in accordance with one or more embodiments shown or described.

Referring first to FIG. 1, a vehicle 100 includes a chassis 110 with a plurality of wheels 120. Chassis 110 may either be of body-on-frame or unibody construction, and both configurations are deemed to be within the scope of the present disclosure. The passenger compartment 130 is formed inside the chassis 110 and serves not only as a place to transport passengers and cargo, but also as a place from which a driver may operate vehicle 100. A guidance apparatus (which may include, among other things, steering wheel, accelerator, brakes or the like) 140 is used in cooperation with the chassis 110 and wheels 120 and other systems to control movement of the vehicle 100. An ICE 150 is situated within an engine compartment in or on the chassis 110 to provide propulsive power to the vehicle 100 while a controller 170 interacts with ICE 150 to provide instructions for the latter's operation.

Figure 2:
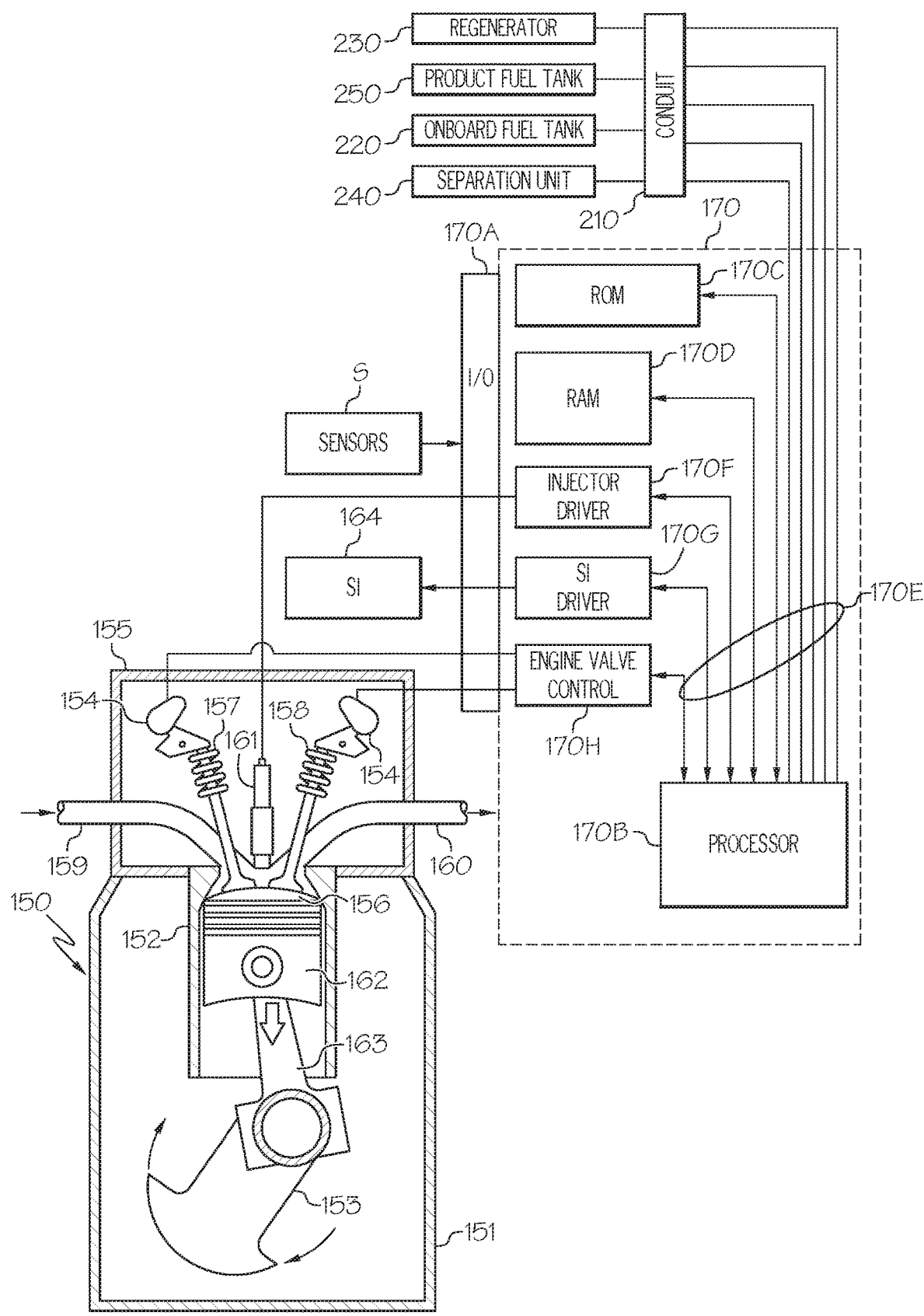
FIG. 2 shows a simplified cutaway view of a cylinder of the engine of FIG. 1 along with a controller in accordance with one or more embodiments shown or described.

Referring next to FIG. 2, details associated with the structure and operation of a portion of the ICE 150 and the controller 170 are shown. The ICE 150 includes an engine block 151 with numerous cylinders 152, a crankshaft 153 rotatably movable within the block 151, numerous cams 154 responsive to movement of the crankshaft 153, a head 155 coupled to the engine block 151 to define numerous combustion chambers 156. The head 155 includes inlet valves 157 and exhaust valves 158 (only one of each is shown) that in one form may be spring-biased to move in response to the crankshaft 153 through a corresponding one of the cams 154 that are controlled by either a crankshaft-driven chain, crankshaft-actuated pushrods or pneumatic actuators (none of which are shown). An air inlet 159 and an exhaust gas outlet 160 are in selective fluid communication with each of the combustion chambers 156 through a fuel injector 161, while a piston 162 is received in each respective cylinder 152 and coupled to the crankshaft 153 through a connecting rod 163 so that the reciprocating movement of the piston 162 in response to an SI or CI combustion taking place within the combustion chamber 156 is converted by the pivoting movement of the connecting rod 163 and crankshaft 153 to rotational movement of the crankshaft 153 for subsequent power delivery to the remainder of a powertrain that is made up of the ICE 150 and transmission, axles, differentials (none of which are shown) and wheels 120. Although ICE 150 is shown without a spark ignition device (such as a spark plug) in a manner consistent with the various CI-based engine configurations (such as RCCI, HCCI or the like), it will be understood that in certain operating loads or conditions such as low loads, cold starts and associated warm-ups, such a spark ignition may be used (possibly in conjunction with some throttling) to increase the flame propagation combustion rate while keeping lower cylinder pressures.

In one form, ICE 150 is configured as a gasoline compression ignition (GCI) engine that can be operated with a gasoline-based fuel. In such case, the presently-disclosed fuel system may be used to achieve COD through operation on various fuels, including market gasoline, gasoline without an oxygenate or related anti-knock compound (also referred to as base gasoline) or gasoline with one of the many types of alkyls, aromatics or alcohols. In one non-limiting example, such fuel may have a boiling temperature in the range of ambient to about 200° C. Unlike an SI mode of operation where the fuel is substantially injected during the four-cycle operation's inlet stroke, a GCI mode substantially injects the fuel during the compression stroke. In one form, the fuel and air are not fully mixed, which permits phasing of the combustion process to be controlled by the injection process. Moreover, the ignition delay permitted by gasoline-based fuels versus diesel-based fuels will allow for the partially premixed fuel and air to become more mixed during compression, which in turn will lead to improvements in combustion. Gasoline-based market fuels with some amount of fuel and air premixing helps ensure suitable fuel-air equivalence ratios for various engine loads and associated fuel injection timing scenarios. Thus, when configured as a GCI engine, ICE 150 using a fuel in the gasoline autoignition range (where for example, the RON is greater than about 60 and the CN is less than about 30) can provide relatively long ignition delay times compared to conventional diesel fuels. This in turn can lead to improved fuel-air mixing and related engine efficiency, along with lower soot and NOx formation; this latter improvement leads in turn to a simplified exhaust gas treatment system since the emphasis is now on oxidizing hydrocarbons and carbon monoxide in an oxygen-rich environment rather than trying to simultaneously control NOx and soot. Moreover, when operated as a GCI engine, ICE 150 requires lower fuel injection pressures than diesel-based CI engines.

Furthermore, when configured as a GCI engine, ICE 150 may take advantage of gasoline-based market fuels that require lower amounts of processing; in one form, the fuel may be in the form of gasoline with an intermediate RON of between about 70 and 85. Such octane concentrations could then be adjusted via OOD or COD through the operation of the fuel system 200 that is discussed in more detail elsewhere in this disclosure.

Moreover, unlike HCCI modes of operation where the fuel and air is fully premixed prior to introduction into the combustion chamber 156, the GCI embodiment of ICE 150 will permit CI operation under higher engine loads and compression ratios without concern over engine knocking. Furthermore, by permitting in-cycle control of the combustion phasing, an ICE 150 configured as a GCI can take advantage of fuel injection timing in order to make it easier to control the combustion process compared to an HCCI configuration where the combination of temperature and pressure inside the cylinder may not be precisely known.

In another form, ICE 150 is configured as an SI engine that can be operated with a gasoline-based fuel. In this case, the presently-disclosed fuel system may be used to achieve OOD through operation on various fuels, including market gasoline, gasoline without an oxygenate or related anti-knock compound or gasoline with one of the many types of alkyls, aromatics or alcohols.

Controller 170 is used to receive data from sensors S and provide logic-based instructions to the various parts of the fuel system 200 that will be discussed in more detail later. As will be appreciated by those skilled in the art, controller 170 may be a singular unit such as shown notionally in FIGS. 1 and 2, or one of a distributed set of units throughout the vehicle 100, this latter configuration as shown notionally in FIG. 3. In one configuration, controller 170 may be configured to have a more discrete set of operational capabilities associated with a smaller number of component functions such as those associated solely with the operation of the fuel system 200. In such a configuration associated with only performing functions related to operation of the fuel system 200, the controller 170 may be configured as an application-specific integrated circuit (ASIC). In another configuration, controller 170 may have a more comprehensive capability such that it acts to control a larger number of components, such as the ICE 150, either in conjunction with or separately from the fuel system 200. In this configuration, the controller 170 may be embodied as one or more electronic control units (ECUs). It will be appreciated that ASICs, ECUs and their variants, regardless of the construction and range of functions performed by the controller 170, are deemed to be within the scope of the present disclosure.

In one form, controller 170 is provided with one or more input/output (I/O) 170A, microprocessor or central processing unit (CPU) 170B, read-only memory (ROM) 170C, random-access memory (RAM) 170D, which are respectively connected by a bus 170E to provide connectivity for a logic circuit for the receipt of signal-based data, as well as the sending of commands or related instructions to one or more of the components within ICE 150, one or more components within fuel system 200, as well as other components within vehicle 100 that are responsive to signal-based instructions. Various algorithms and related control logic may be stored in the ROM 170C or RAM 170D in manners known to those skilled in the art. Such control logic may be embodied in a preprogrammed algorithm or related program code that can be operated on by controller 170 and then conveyed via I/O 170A to the fuel system 200. In one form of I/O 170A, signals from the various sensors S are exchanged with controller 170. Sensors may comprise pressure sensors, temperature sensors, optical sensors, acoustic sensors, infrared sensors, microwave sensors, timers or other sensors known in the art for receiving one or more parameters associated with the operation of ICE 150, fuel system 200 and related vehicular components. Although not shown, controller 170 may be coupled to other operability components for vehicle 100, including those associated with movement and stability control operations, while additional wiring such as that associated with a controller area network (CAN) bus (which may cooperate with or otherwise be formed as part of bus 170E) may also be included in situations where controller 170 is formed from various distributed units.

In situations where the controller 170 is configured to provide control to more than just the fuel system 200 (for example, to the operation of one or more of the ICE 150 or other systems within vehicle 100), other such signals from additional sensors S may also be signally provided to controller 170 for suitable processing by the control logic; one such example may include those signals where combustion data from the ICE 150 is provided for control over the mixing or related delivery of the fuel and air. Likewise, in a manner consistent with various modes of ICE 150 operation, controller 170 may be programmed with drivers for various components within ICE 150, including a fuel injector driver 170F, a spark plug driver (also called a spark ignition driver, for SI modes of operation) 170G, engine valve control 170H and others that can be used to help provide the various forms of fuel introduction to the combustion chamber 156, including those associated with a multiple-late-injection, stratified-mixture, low-temperature combustion (LTC) process as a way to promote smooth operation and low NOx emissions of ICE 150 over a substantial entirety of its load-speed range. Within the present context, load-speed mapping of ICE 150 may be used to identify operating regions such as those used during cold starts and ICE 150 warm-up, low ICE 150 loads, medium ICE 150 loads and high ICE 150 loads, where correspondingly lower amounts of exhaust gas re-breathing takes place through manipulating the overlap of the intake valve 157 relative to the exhaust valve 158, possibly in conjunction with other approaches such as exhaust gas recirculation (EGR) to help provide one or more of combustion control, exhaust gas emission reductions, or other operability tailoring for ICE 150.

In addition to providing instructions for combustion control, emission reductions or the like, controller 170 interacts with conduit 210 and various actuators, valves and related components to control the operation of the delivery of a market fuel from an onboard fuel supply tank 220, regenerator 230, separation unit 240 and enriched product tank 250 in order to effect the production of OOD or COD required to operate ICE 150 for a given set of load and related operating conditions. In one form of CAN, the controller 170 could manage the fuel flow from either the fuel tank 220 or the enriched product tank 250 to the combustion chamber 156 where the two fuels corresponding to OOD or COD are injected separately, or by blending prior to being introduced into the combustion chamber 156 at different ratios depending on load, speed and other optional parameters associated with operation of ICE 150.

In particular, controller 170 is useful in promoting customizable fuel injection and subsequent combustion strategies for various CI engine configurations. For example, when used in conjunction with a GCI-based engine, the controller 170 may instruct the fuel to be injected in a staged manner late in the compression phase of the engine's four-cycle operation. In this way, the fuel charge may be thought of as having both locally stoichiometric and globally stratified properties. Significantly, because an octane-rich fuel (for example, gasoline) has a higher volatility and longer ignition delay relative to a cetane-rich fuel (for example, diesel), by introducing the octane-rich fuel into the combustion chamber 156 relatively late in the compression stroke and taking advantage of the fuel's inherent ignition delay (which helps to promote additional fuel-air mixing), combustion does not commence until after the end of the injection. To achieve a desirable degree of stratification, multiple injections may be used. By operating under the LTC conditions that are associated with stratified fuel combustion, GCI engines can have significantly reduced NOx production and soot emissions while achieving diesel-like thermal efficiencies. Moreover, such an approach permits the vehicle 100 to use an onboard market fuel with a lower octane than would otherwise be used. This is beneficial in that such fuel requires a smaller amount of processing than conventional gasoline and diesel fuels; this in turn reduces the entire well-to-tank emissions of other undesirable substances, such as $CO_2$.

In addition to a GCI engine, such instructions as provided by controller 170 are particularly beneficial for the multiple-late injection strategy used for the delivery of fuel in RCCI or related modes of operation of ICE 150, as such delivery is optimized when it coincides with various sequences in the compression stroke that can be measured by sensors S as they detect crank angle degree (CAD) values from the crankshaft 153 to help control when auto-ignition occurs. Within the present context, the position of the piston 162 within the cylinder 152 is typically described with reference to CAD before or after the top dead center (TDC) position of piston 162. The controller 170 may also base such delivery strategies on other ICE 150 operating parameters such as the previously-mentioned load and engine speed, as well as the number of times such injection is contemplated. For example, CAD from 0° to 180° corresponds to the power stroke, with 0° representing TDC and 180° representing bottom dead center (BDC). Likewise, CAD from 180° to 360° represents an exhaust stroke with the latter representing TDC. Moreover, CAD from 360° to 540° represents an intake stroke with BDC at the latter. Furthermore, CAD from 540° to 720° represents a compression stroke with TDC at the latter. By way of example, the controller 170—when used in a 6-cylinder engine—would have ignition taking place every 120° of crankshaft 153 rotation, that is to say three ignitions per every revolution of ICE 150. Thus, when ignition has taken place each of the six cylinders one time, the crankshaft 153 has rotated twice to traverse 720° of rotary movement. Likewise, if ICE 150 were configured as a 4-cylinder engine, the ignition would take place every 180° of crankshaft 153 rotation. In one form, one of the sensors S may be a crank sensor to monitor the position or rotational speed of the crankshaft 153. The data acquired from such a crank sensor is routed to the controller 170 for processing in order to determine fuel injection timing and other ICE 150 parameters, including ignition timing for those circumstances (such as cold startup, and the ensuing warm-up) where a spark ignition device is being used. Sensors S such as the crank sensor may be used in combination with other sensors S (such as those associated with valve 157, 158 position) to monitor the relationship between the valves 157, 158 and pistons 162 in ICE 150 configurations with variable valve timing. Such timing is useful in CI modes of operation of ICE 50 in that it can close the exhaust valves 158 earlier in the exhaust stroke while closing the intake valves 157 earlier in the intake stroke; such operation as implemented by controller 170 can be used to adjust the effective compression ratio of ICE 150 in order to obtain the required temperature and pressure associated with CI combustion. Likewise, when SI combustion is required, the controller 170 may instruct the valves 157, 158 to reduce the compression ratio consistent with SI operation. Likewise, the controller 170 may—depending on the need of ICE 150—provide auxiliary sparking for fuel preparation (such as the generation of free radicals in the air-fuel mixture). Sensed input (such as that from various locations within ICE 150, including CAD from the crankshaft 153, as well as those from driver-based input such as the accelerator of guidance apparatus 140) may be used to provide load indicia. Likewise, in addition to suitable adjustment of the valves 156, 157, balanced fuel delivery from each of the enriched product tank 250 with pressurizing forces provided by one or more fuel pumps 260 may be achieved by controller 170 depending on if ICE 150 is in a CI mode or an SI mode of operation. Although there is only one pump 260 shown (immediately upstream of the fuel injector 161) in an attempt to keep visual clarity within the figure, it will be appreciated that additional pumps 260 may be placed in other locations within conduit 210 in order to facilitate the flow of fuel through the fuel system 200, and that all such variants are within the scope of the present disclosure.

The controller 170 may be implemented using model predictive control schemes such as the supervisory model predictive control (SMPC) scheme or its variants, or such as multiple-input and multiple-output (MIMO) protocols, where inputs include numerous values associated with the various post-combustion exhaust gas treatment components, sensors S (such as exhaust gas temperature sensor, $O_2$ sensor, NOx sensor, SOx sensor or the like), estimated values (such as from the lookup tables or calculated algorithmically) or the like. In that way, an output voltage associated with the one or more sensed values from sensors S is received by the controller 170 and then digitized and compared to a predetermined table, map, matrix or algorithmic value so that based on the differences, outputs indicative of a certain operational condition are generated. These outputs can be used for adjustment in the various components within the purview of the controller 170, such as the remaining components associated with fuel system 200.

As mentioned above, in one form, controller 170 may be preloaded with various parameters (such as atmospheric pressure, ambient air temperature and flow rate, exhaust gas temperature and flow rate or the like) into a lookup table that can be included in ROM 170C or RAM 170D. In another form, controller 170 may include one or more equation- or formula-based algorithms that permit the processor 170B to generate a suitable logic-based control signal based on inputs from various sensors, while in yet another form, controller 170 may include both lookup table and algorithm features to promote its monitoring and control functions. Regardless of which of these forms of data and computation interaction are employed, the controller 170—along with the associated sensors S and associated flow control conduit 210—cooperate such that as an operating load on the ICE 150 varies, a suitable adjustment of the market fuel that is present in the onboard fuel supply tank 220 may be made to provide the amount of octane or cetane enrichment needed for such operating load by mixing the onboard market fuel with one or the other of the product fuels from the enriched product fuel tank 250.

One parameter of ICE 150 that may be preloaded into or generated by controller 170 is the mean effective pressure (MEP). In one form, MEP may be used to correlate ICE 150 operating conditions to fuel needs and the various forms of multiple-late injection strategies discussed previously for various CI engine configurations. MEP—including its variants indicated mean effective pressure (IMEP), brake mean effective pressure (BMEP) or friction mean effective pressure (FMEP)—provides a value of the ability of a particular ICE 150 to do work without regard to the number of cylinders 152 or related ICE 150 displacement. Moreover, it provides a measure of the pressure corresponding to the torque produced so that it may be thought of as the average pressure acting on a piston 162 during the different portions of its four cycles (inlet, compression, ignition and exhaust). In fact, MEP is a better parameter than torque to compare engines for design and output because of its independence from engine speed or size. As such, MEP provides a better indicator than other metrics (such as horsepower) for engines in that the torque produced is a function of MEP and displacement only, while horsepower is a function of torque and rpm. Thus, for a given displacement, a higher maximum MEP means that more torque is being generated, while for a given torque, a higher maximum MEP means that it is being achieved from a smaller ICE 150. Likewise, higher maximum MEP may be correlated to higher stresses and temperatures in the ICE 150 which in turn provide an indication of either ICE 150 life or the degree of additional structural reinforcement in ICE 150. Significantly, extensive dynamometer testing, coupled with suitable analytical predictions, permit MEP to be well-known for modern engine designs. As such, for a CI engine, MEP values of about 7.0 bar to about 9.0 bar are typical at engine speeds that correspond to maximum torque (around 3000 rpm), while for naturally aspirated (that is to say, non-turbocharged) SI engines, MEP values of about 8.5 bar to about 10.5 bar are common, while for turbocharged SI engines, the MEP might be between about 12.5 bar and about 17.0 bar.

Likewise, MEP values may be determined for various operating regimes for ICE 150. Such operating regimes may include low power or load (including, for example, engine idling conditions) that is one form corresponds to a MEP of up to about 1.0 bar, in another form of an MEP of up to about 2.0 bar. Likewise, such operating regimes may include normal (or medium) power or load that is one form corresponds to a MEP of between about 2.0 bar to about 5.0 bar, in another form of an MEP of between about 2.0 bar and about 6.0 bar, in another form of an MEP of between about 2.0 bar and about 7.0 bar. Moreover, such operating regimes may include a high power or load that in one form corresponds to a MEP of about 7.0 bar and above, in another form of an MEP of about 8.0 bar and above, in another form of an MEP of about 9.0 bar and above, and in another form of an MEP of about 10.0 bar and above.

As will be understood, these and other MEP values may be input into a suitably-mapped set of parameters that may be stored in a memory accessible location (such as the lookup tables mentioned previously) so that these values may be used to adjust various ICE 150 operating parameters, as well as for the controller 170 when acting in a diagnostic capacity. In such case, it may work in conjunction with some of the sensors S, including those that can be used to measure cylinder 152 volume (such as through crankshaft 153 angle or the like).

Figure 3:
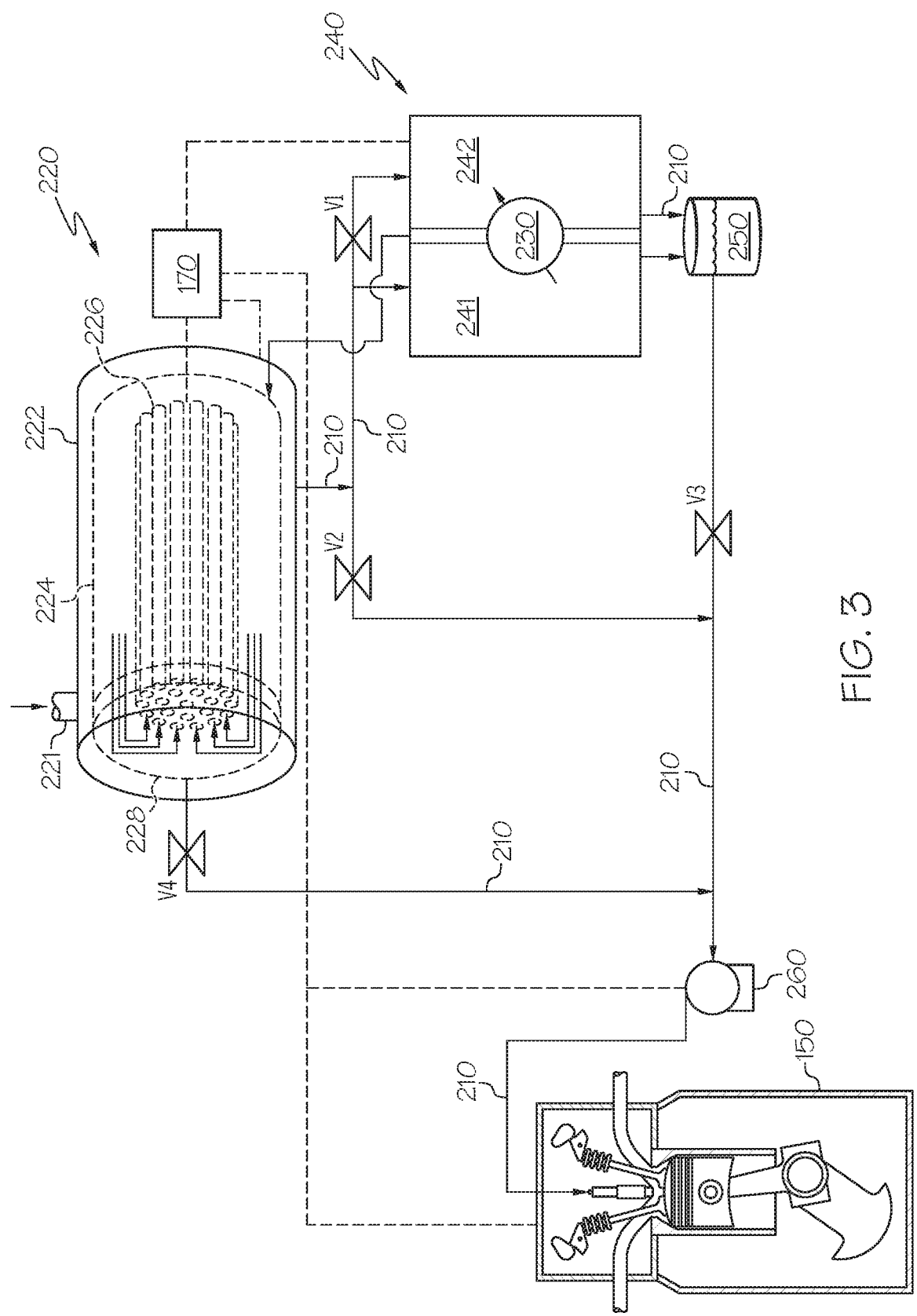
FIG. 3 illustrates a simplified view of an onboard fuel separation system in accordance with one or more embodiments shown or described.

Referring next to FIG. 3, details associated with managing the heat balance associated with performing onboard COD and OOD operations while avoiding complicated system redundancy for fuel system 200 is shown. Significantly, by taking advantage of existing onboard fuel delivery and ICE 150 operating infrastructure, any on-vehicle cooling and heating needed to promote the various adsorbing and regenerating activities can be achieved without requiring additional equipment or efficiency-decreasing modes of operation of the ICE 150. The fuel system 200 includes a network of pipes, tubing or related flow channels—along with various valves to preferentially permit or inhibit the flow of the onboard fuel and its byproducts of fuels, depending on the need—that make up conduit 210.

The fuel supply tank 220 is used for the storage of the market fuel that it receives via inlet 221 from a conventional fuel pump such as those used in retail filling stations. In one form—such as that associated with GCI operation—the market fuel may comprise an even lower-grade of gasoline-based fuel, such as the previously-mentioned intermediate RON gasoline. Significantly, the fuel supply tank 220 also acts as a heat exchanger that is made up of numerous nested housings that define hollow, volumetric regions making up a first compartment 222, a second compartment 224 and a third compartment 226, all of which are used for the storage and selective conveyance of various forms of the fuel that is onboard vehicle 100. In one form, the housing used for the first compartment 222 defines the outermost structure, and as such may function as a containment vessel or related structure for the housings that make up the other two compartments. More particularly, in the form shown, this outermost structure that corresponds to the first compartment 222 allows the fuel supply tank 220 to use a concentric arrangement between the first compartment 222 and the inner two compartments 224 and 226; such a closely-packed storage and heat exchange configuration is particularly appropriate for small or compact passenger-based configurations of vehicle 100 (such as smaller two-seat cars, two-door coupes and four-seat sedans) that do not have the luxury of additional space such as that inherent in larger passenger vehicles, commercial vehicles or industrial vehicles. While the housing that makes up the first compartment 222 is presently shown in generally cylindrical form, it will be appreciated that other suitable fuel containment structural forms or shapes may also be employed, and that as long as they permit the heat exchange functions discussed in the present disclosure, all such variants are within the scope of the present disclosure.

The second compartment 224 is used for the storage of the octane-rich fuel component that has been produced by the sorption of a portion of the onboard market fuel that has been conveyed from the first compartment 222 to the separation unit 240 the details of which are discussed in more detail elsewhere in this disclosure. Within the present context, the octane-rich fuel component achieves such status when it is placed in a form that it can be introduced into the combustion chamber 156 for subsequent combustion; in one form, such octane-rich fuel component is in a liquid form after having been condensed from a vaporized form after being desorbed by the separation unit 240. In one form, the housing that makes up the second compartment 224 is shaped with an elongate axial dimension in an manner similar to that of the housing that makes up the first compartment 222, while of smaller outer dimensions in order to enable it to fit within the internal volume defined by the housing that makes up the first compartment 222. In such a configuration, when the first compartment 222 is filled with onboard market fuel, the exterior surface of the housing that makes up the second compartment 224 is substantially immersed within such fuel. In this way, the fuel system 200 may take advantage of any temperature differences between the fuels contained in these two compartments 222, 224 in order to help generate the octane-rich fuel component for selective use in combustion chamber 156. Significantly, the first and second compartments 222, 224 are fluidly isolated from one another such that the enriched levels of octane present within the latter compartment are not diluted by the non-enriched levels present within the former.

The third compartment 226 is used for additional storage of any of the octane-rich fuel component that has been produced by the at least partial condensation within the second compartment 224 of the desorbate produced in the separation unit 240. More particularly, because the housing making up the third compartment 226 is nested within the internal volume defined by the second compartment 224, it is substantially immersed within such the octane-rich fuel component in a manner similar to that of the second compartment 224 relative to the first compartment 222 as previously discussed. As shown, the housing that makes up the third compartment 226 is in the form of a bundle of individual tubes that extend linearly along the elongate dimension defined by that of the first and second compartments 222, 224. In one form, the tubes may be open at both ends such that the tubes may act as a temporary storage for the octane-rich fuel component, as well as a conduit or related flowpath to deliver such fuel component from the second compartment 224 to the combustion chamber 156, either directly or through a manifold 228 that may be included as an end cap for the second compartment 224. Furthermore, it will be appreciated that the tube number and size can be adjusted to fulfill the designed cooling or condensation requirements of the octane-rich fuel component, as well as of any remaining vaporized octane-rich adsorbate.

By such construction, the second and third compartments 224, 226 form a shell-and-tube heat exchanger configuration where the housing of the second compartment 224 acts as a shell-like fluid container for both the vaporized form of the adsorbate from the separation unit 240 and the octane-rich fuel component that results from condensation of the vaporized adsorbate, as well as a fluid vessel around the tube bundle that makes up the housing of the third compartment 226. Likewise, the housing that makes up the first compartment 222 may be considered a shell that acts as a fluid vessel around the tube-like housing of the second compartment 224. In the larger shell-and-tube arrangement defined by the first and second compartments 222, 224, the larger vessel provides a relatively large heat sink for condensing the vaporized adsorbate that is created during adsorbent regeneration in the separation unit 240 and conveyed to the second compartment 224. In the smaller shell-and-tube arrangement defined by the second and third compartments 224, 226, the third compartment 226 may also serve as a supplemental heat sink to the larger vessel in situations where some residual octane-rich fuel component resides within one or more of the individual tubes. Such a situation might arise where the vehicle 100 has not been in an operational state for a prolonged period (such as overnight) of time that is sufficient to have allowed the fuel component contained within to cool down.

Thus, the concentrically-arranged shell-based structural, fluid and thermal cooperation between the three compartments 222, 224 and 226 is constructed in such a manner to functionally replace three separate units (namely, a conventional vehicle fuel tank, separate regenerated fuel condenser and the condensed fuel storage tank) in order to help promote a more compact fuel system 200. During operation of the vehicle 100, the onboard fuel that resides in the first compartment 222 cools the vaporized adsorbate and any octane-rich fuel component (as condensate) that is present inside the second compartment 224. Upon operation of a pump 260 that is disposed within conduit 210, at least a portion of the onboard fuel is made to exit the first compartment 222 to be routed into either the adsorption-desorption chambers 241, 242 of the separation unit 240, or directly to the combustion chamber 156, depending on which operational condition for ICE 150 is determined by the controller 170. In one form, any such condensed liquid may be placed in selective (rather than constant) fluid communication with the desorbed vapor because there may be some modes of operation of ICE 150 (such as that mentioned previously in conjunction with certain driving cycles) where it is desirable to have the desorbed octane or the remainder cetane be sent directly to the combustion chamber 156 for use.

Once the fuel is placed in fluid contact with one of the sorption chambers 241, 242 (again, as determined by the controller 170, with the possible input from sensors S to determine whether one or the other of the sorption chambers 241, 242 is in a state of saturation, high temperature or the like), some of the onboard fuel is adsorbed, while some leaves the separation unit 240 to an enriched product tank 250 until needed. One or more of valves V1, V2, V3 and V4 may be manipulated (also through controller 170) to help effect fuel flow to a preferred location. Within the present context, the various valves V1, V2, V3 and V4 (as well as pump or pumps 260) make up a portion of the conduit 210; with regard to such valves, it will be appreciated that there may be greater or fewer in number, depending on the precise configuration of conduit 210, and that all such variants are deemed to be within the scope of the present disclosure. For example, in one form of operation, these or other valves (not shown) may be used to alternate between the sorption chambers 241, 242 so that they are selectively switched to provide batch-like processing.

The adsorbed portion of the onboard fuel is maintained on the adsorbent surface of the respective sorption chamber 241, 242 until either the chamber becomes saturated or the chamber temperature becomes high enough. In the case of saturation, it may be necessary to extract the adsorption heat (such as through a suitable coolant). In addition, when the incoming flow of onboard fuel is switched to the other of the sorption chambers 241, 242, a heat supply (from either the car coolant or the exhaust gas) is circulated into the respective chamber to the regenerator 230 that acts as a vaporizing heat exchanger for the adsorbed fuel. The regenerated fuel vaporizes, causing it to rise vertically upward to enter into the second compartment 224 via portion of conduit 210 in order to promote significant heat transfer. In one form, such heat transfer causes condensation of the regenerated fuel vapor by exchanging its heat content with the onboard fuel that is resident within the first compartment 222 of the main tank. As discussed previously, additional condensation of the regenerated fuel vapor may take place in situations where the various tubes of the third compartment 226 may already contain stored (and previously condensed) octane-rich fuel component such as that associated with a prolonged period of vehicle 100 and fuel system 200 inactivity. This has the effect of providing a so-called "double side cooling" on the portion of the fuel that is present within the second compartment 224. This improved amount of heat transfer allows the size of the heat exchange structure to be reduced.

The octane-rich fuel component may then be directed to storage until needed. In one form, a separate product tank (not shown, but similar in construction to enriched product tank 250) may be included by allowing one or both of the second and third compartments 224, 226 (as well as the portions of conduit 210 that are fluidly downstream of the second and third compartments 224, 226) to act as storage vessels in an attempt to minimize the complexity and volumetric impact of the production of the octane-rich fuel component. Likewise, the ICE 150 may be made—through the cooperation of the fuel system 200 and the controller 170—to receive the octane-rich fuel component that is stored in the tube bundles of the third compartment 226, the cetane-rich fuel component that resides in the enriched product tank 250 (or the adjacent portion of the conduit 210), or the onboard (that is to say, market) fuel that is present in the first compartment 222. As discussed elsewhere within the present disclosure, the controller 170 may also be used to ensure suitable vehicle 100 operation, especially in situations where the octane-rich or cetane-rich fuel components are not enough to provide ample combustible fuel to the ICE 150 in certain operating conditions, such as at the beginning of the driving cycle, if the demand is higher than expected, or where no heat is available onboard to desorb (that is to say, vaporize) the fuel (such as during a cold start).

In one form, it may be beneficial to maintain the temperature of the onboard fuel that is present within the first compartment within a prescribed range. One way to achieve this is to use an injector (not shown) and an insulated part (not shown) in the volumetric region between the first and second compartments 222, 224. In such construction, the injector pulses the needed amount of the onboard fuel from an insulated part of the first compartment 222 to an uninsulated part, where such insulation difference can be in the form of low thermal-conductivity materials appropriately placed, while in another form as one or more baffles distributed through the volumetric region defined within the first compartment 222. Regardless of the form of insulation, it promotes a more homogeneous heat transfer, as well as a higher amount of contact between the fuel and the heat exchange surface area of the housings that define both the first and second compartments 222, 224.

Significantly, the fuel system 200 may operate using residual thermal energy from the vehicle 100, such as that from the waste heat of the combustion process that takes place within the combustion chamber 156 of ICE 150. This use of existing heat helps further promote overall duel system 200 compactness by reducing component redundancy. As mentioned previously, a batch-like processing approach may be made to take place within the separation unit 240 where the pair of sorption chambers 241, 242 are placed in thermal communication with the regenerator 230, all within a housing or related containment structure. Thus, upon receipt of the market (that is to say, onboard) fuel from the fuel supply tank 220 through conduit 210 and an optional preheater (not shown), the first of the sorption chambers 241 is sized and shaped to fluidly receive an aromatic (that is to say, octane-rich) compound such that contact of the aromatic on the surface of sorption chamber 241 results in the creation of an octane-rich adsorbate for OOD, such as by the preferential action of a suitable functional group contained within or formed on the surface of the adsorbent that makes up the sorption chamber 241 as will be discussed in more detail later in this disclosure. The two-chamber construction of the separation unit 240 is such that while octane-rich adsorption is taking place in sorption chamber 241, any adsorbent that was previously saturated in the other sorption chamber 242 is regenerated by exposure of the adsorbate to elevated temperatures (such as from exhaust gas from ICE 150 or a hot coolant from a radiator-based cooling system or the like) through the regenerator 230. With a different choice in adsorbent in the sorption chambers 241, 242, a cetane-rich adsorbate (rather than octane-rich adsorbate) can be formed in a comparable manner for COD through the use of a size-selective adsorbent. In one form, such OOD-specific and COD-specific activity may be achieved through multi-stage configurations of separation unit 240 where sequentially-placed units each with one or more of the sorption chambers 241, 242 may be arranged, each configured with suitable affinity-based or size-selective adsorbents. Thus, in one form, by the operation of the adsorbent that is configured to preferably retain aromatics or related functionality-based fuel components such as oxygenates or double bond-based alkyls, much of the octane-rich portion of the market fuel forms on the surface of the sorption chamber 241 while much of the cetane-rich portion passes through to become a remainder that can be then conveyed (as shown) to the cetane-enriched product tank 250 or back (not shown) to the fuel supply tank 220. Although presently shown as a separate cetane-enriched product tank 250, it will be appreciated that—depending on the latency or resident period associated with the presence of the cetane-rich remainder within the portion of conduit 210 that extends from the point of discharge from the separation unit 240 to the introduction of such remainder into the combustion chamber 156 of internal combustion engine 150—such portion of conduit 210 may be sufficient to in effect emulate the storage capability of cetane-enriched product tank 250 such that it is the functional equivalent. In such circumstances, that portion of the conduit 210 may be deemed to be a cetane-enriched product tank 250 within the meaning of the present disclosure.

Within the present context, the terms "adsorb", "adsorbate" and their variant includes those portions of the onboard fuel that interact by surface retention (rather than by bulk absorption) with the adsorbent that makes up the sorption chambers 241, 242, while the terms "desorb", "desorbate" and their variant includes those portions of the adsorbate that are subsequently liberated from the adsorbent as a result of some regenerating action. In one non-limiting form, such desorbing may take place by the application of a quantity of heat to the sorption chambers 241, 242 sufficient to vaporize the adsorbate. Furthermore, it will be appreciated that unlike chemical reactions, adsorption is a physical phenomenon, although in certain circumstances the term chemi-sorption may be used. Likewise, within the present context, the remainder (also referred to as the filtrate) is the portion of the market fuel being exposed to the adsorbent in the sorption chambers 241, 242 that does not get adsorbed, such as through one or both of the previous-discussed functional group (affinity-based) or molecular sieve (size-selective) operations.

The two-chamber construction of the separation unit 240 is conducive to the batch processing of octane-enriched or cetane-enriched fuel. In particular, the two sorption chambers 241, 242 may be operated in a parallel manner such that while one is being used as an adsorbent to preferentially capture a thin film of octane-rich adsorbate, the other may be exposed to the latent heat from the operation of ICE 150 in order to regenerate the adsorbent by desorbing the previously-collected adsorbate, after which the roles of the two chambers 241, 242 are reversed through manipulation by controller 170 of valves (not shown) that make up part of conduit 210. In order to have a compact separation unit 240 that does not add much to the weight of vehicle 100, the adsorbent type is selected to give a high surface area-to-volume ratio by exploring the geometry and structure of the adsorbent particles and bed that makes up the two sorption chambers 241, 242. In particular, higher surface area leads to higher adsorption capacity and smaller separation unit 240 size, which in turn promotes ease of system integration. In another context, the use of the regenerator 230 and the batch process associated with selective adsorption and regeneration of the sorption chambers 241, 242 helps to maintain the separation unit 240 within a desired design temperature range. It will be appreciated that the desired temperature range depends on the solid sorbent being used and its interaction with the targeting components of the fuel. For example, oxygenates adsorption is stronger than linear alkanes and desorbing them will require a higher temperature. Likewise, if the desorption is by vaporization, then the temperature will be equal to the boiling point of the desorbed components plus 5° C. to 20° C. For aromatics in the gasoline range, desorption will take place above 110° C. Moreover, if the desorption is by solvent, then the temperature of the sorbent will remain around the ambient temperature, although the solvent is separated from the target component by flashing at a temperature close to the boiling point of the solvent. For size selective separation, the temperature of the sorbent will likewise remain around the ambient temperature.

As mentioned previously, various forms of stratified combustion may lead to the types of LTC that are beneficial to low-$NO_x$ modes of operation of ICE 150. With regard to the use of OOD or COD for a CI engine, the fuel may be formed as a hybrid of a main fuel (for example, gasoline or other low-cetane variant) and an igniter fuel (for example, diesel or other high-cetane variant), where the location, frequency and timing of introduction of each varies by concept or configuration such as those discussed previously. For example, in one concept, a single high-octane fuel is introduced via direct injection during a compression stroke. In such case, the injection of the fuel takes places at a time relatively retarded from conventional diesel injection timing to ensure adequate mixing. Since the overall combustion process is dominated by reactivity-controlled LTC, the resulting NOx and soot exhaust emissions tend to be very low. In another case, a single igniter fuel is introduced via direct injection during the compression stroke in order to promote cold-start and high-load operation where the overall combustion process is dominated by diffusion-controlled mixing of the fuel at or near the piston 162 TDC movement. In still another case, a dual injection regime introduces the main fuel via port fuel injection early in the compression stroke such that it is fully mixed with a fresh air charge during the intake stroke, after which the igniter fuel is introduced via direct injection as a way to control ignitability such that the overall combustion process is dominated by the spatially well-mixed high-octane fuel after the ignition of high-cetane fuel. As with the first case mentioned previously, such operation produces low NOx and soot emissions, due at least in part to an overall lean mixture. In yet another case, the main fuel is introduced via direct injection during the compression stroke, while the igniter fuel is introduced via direct injection near TDC to enable the ignition control; in this way, it provides a relatively robust mixture via improved thermal or spatial stratification. This in turn leads to low hydrocarbon, NOx and soot formation, at least for relatively low engine loads.

In one form, a so-called partial bypass may be used for intermittent circumstances (such as cold starts, or where one of the two high-octane or low-octane fuel tanks may be empty) such that a fraction of the market fuel from the fuel supply tank 220 is provided directly to the combustion chamber 156 without entering the separation unit 240. This partial bypass the operation of which may be established by controller 170 helps promote a continuous supply of fuel to ICE 150, and that such continuity is particularly useful under the intermittent operating conditions mentioned previously. In particular, the controller 170 may be used to manipulate various fuel delivery parameters, such as coolant temperature, exhaust gas temperature, level of separated fuels, delivery timing or the like for such transient operating situations. This helps promote wider operating ranges reactivity differences between the high-octane and high-cetane fuel components, especially with regard to reducing NOx or soot emissions over a much wider range, thereby reducing the likelihood of having to make a soot/NOx tradeoff.

Various fuel injection strategies can be utilized to enable optimum efficiency, reduced emissions and improved combustion robustness compared to conventional diesel-based cycles, including using EGR and reduced compression ratios. For example, EGR is used as a way to dilute the mixture and decrease the combustion temperature as part of a larger LTC strategy. Likewise, lowering the compression ratio can help reduce engine friction loss, heat loss and hydrocarbon emissions.

As mentioned previously, in one form, the adsorbents used for the sorption chambers 241, 242 are configured as one or more functional groups presenting on the surface of the sorbent material such that they comprise affinity-based sorbents. In another form, the adsorbents may separate adsorbates by their molecular shape such that they comprise size-selective sorbents. For example, to target high-cetane fuel components, the design would focus on separating linear or slightly branched alkanes from aromatics, cyclic and highly branched alkanes. Stated another way, the solid sorbents discussed in the present disclosure can act in two mechanisms, where in a first, the adsorbent is selected to have functional groups that attract specific molecules such as aromatics, cyclics and oxygenates (if present). The linear and slightly branched molecules (which may include cetane) are not adsorbed and pass through the pores of the sorption chamber 241, 242. The second mechanism is based on the difference in the molecules sizes such that linear molecules (such as n-alkanes) may pass through the relatively porous material while other molecules which have a larger dynamic diameter are hindered from passing through most pores and accumulate in the adsorption-based sorption chamber 241, 242. In this latter mechanism, a packed bed of size-selective sorbent is used for COD generation, as linear alkanes with high CN will go into smaller pores while the other components with larger molecular size will not, causing these other components to come out first as a raffinate. In such case, the preferentially adsorbed linear alkanes could then be desorbed using thermal energy such as discussed in the present disclosure in a manner similar to an affinity-based sorbent. In situations where the market fuel onboard the vehicle 100 is gasoline—based, the thermal regeneration such as available through the operation of a heat exchanger such as that defined within the fuel supply tank 220 is particularly appropriate, as the separated stream of fuel will tend to have a relatively high volatility and associated low temperature boiling point. Examples of the first type of sorbents include: activated carbon, silica, and alumina based sorbents as well as some types of zeolites and functionalized porous material in general. Likewise, zeolites, metal organic frameworks and structured porous material may be made to act according to the second mechanism. As such, the sorption chambers 241, 242 may—in addition to having batch processing capability through selective adsorbing and desorbing activities—be set up in stages (not shown) in the manner previously discussed such that a first stage preferentially provides affinity-based aromatic adsorption while a second stage acts like a size-selective molecular sieve. In this way, the first stage adsorbs octane while the second stage adsorbs cetane. Thus, whereas gasoline has relatively small aromatics with single benzene rings (such as benzene, toluene and xylene), diesel fuel has larger aromatics in the form of polycyclic (or polynuclear) aromatic hydrocarbons (PAHs) including naphthalene and its derivatives. It is recognized that there are some cetane-rich additives that have functional groups, thus, if some such additives are present, then affinity-based sorbents could be used as well for these components. As such—and depending on the needs associated with a particular market fuel—the adsorbents useful in the sorption chambers 241, 242 may be selected with a high affinity for these components specifically, and that the order, placement and configuration of each of the sorption chambers 241, 242 may be configured with the appropriate adsorbent depending on the construction of fuel system 200. In one form, the higher the molecular weight of the adsorbent, the higher the adsorption capacity. Thus, different adsorbents can be used to adsorb the low boiling point straight alkanes as a way to produce a fuel with different specifications. For instance, to adsorb certain aromatics, the adsorbent that makes up the sorption chambers 241, 242 can be mesoporous (2-50 nm diameter) activated carbon, which in turn can lead to an average recovery of about 80%. An example of the anticipated adsorption capacity of some aromatic components for activated carbon is listed in Table 1.

TABLE 1

| Component | mg/g-adsorbent |
| --- | --- |
| Toluene | 15 |
| Naphthalene | 45 |
| 1-methylnaphthalene | 37 |

Other natural adsorbents (for example, coconut shell) may also be used for separating the desired components. In another form, the adsorbent bed of the sorption chambers 241, 242 may be made up of more than one adsorbent in order to preferentially promote the adsorption of a desired species. Regardless of the adsorbent bed choice, the performance is optimized on various factors, including the adsorbent's capacity and selectivity, the concentration ratio of the market fuel (which provides indicia of the aromatics fractions), and how fast the regeneration and desorption-based removal proceeds.

The selection of the ICE 150 and its associated fuel is dependent at least in part on the properties of the fuel and the solid sorbent contained within the sorption chambers 241, 242; such properties may include the relative fractions in the market fuel, boiling temperatures and sorbent separation mechanisms. For example, using an affinity-based sorbent may be used to produce an OOD adsorbate for low boiling-point fuels such as gasoline, while a size-selective sorbent may be used to produce a COD adsorbate for such low boiling-point fuels. In configurations where the separation unit 240 is arranged to have sequentially-placed units each with one or more of the sorption chambers 241, 242 with affinity-based or size-selective adsorbents as discussed previously, it will be appreciated that the order of such separation may be affinity-based first and size-selective second, or size-selective first and affinity-based second, depending on the need.

Thus, for a compact and cost-effective vehicular propulsion system, a smaller fraction of fuel associated with the production of the octane-rich or cetane-rich fuel components may be routed through a longer path within conduit 210 while the larger remaining or unseparated fraction may be made to pass through a shorter path. In this way, the length of the flowpath defined by the fuel system 200 components not used to perform such fuel enrichment may be kept relatively short, especially in view of the fact that the volume of high octane or high cetane fraction fuel components needed in OOD or COD operation is relatively small compared to the remaining fraction of the market fuel that is being supplied to the separation unit 240 or the ICE 150. In one form, the amount of time that ICE 150 is operated under high load is relatively small compared to total operating time. As such, a more compact, low-cost fuel system 200 may be realized when the octane-rich or cetane-rich stream is routed through the longer path (which in one form may involve the separation of between about 20% to 30% of the market fuel as an octane-rich or cetane-rich fuel stream). It is noted that the general use of fuels for certain engine configurations may not be available for all fuel forms at all fueling stations. For example, naphtha (that is to say, the light fuel fraction that results from distillation and boiling that takes place in the gasoline range from about ambient temperature to about 160° C.) typically has only between about one and ten percent aromatics. Thus, in situations where an additional CN boost for a particular COD use is required, these aromatic components that represent the smaller fraction could be separated out, such as through the use of an affinity-based sorbent, as a way to ensure lower combustion temperature and associated lower NOx generation.

Likewise, in one form, the boiling range of the separated fuel stream is within a range that is compatible of heat exchange values that can be provided by the operation of the ICE 150. Thus, when such a stream has relatively high volatility—such as the case when separating gasoline fractions—then the heat available onboard from the operation of ICE 150 is enough to regenerate the sorbent. As such, using a gasoline-based market fuel for GCI or SI modes of operation of ICE 150 may be employed so long as the boiling range of the adsorbate or remainder is compatible with the thermal environment being generated in the heat exchanger 243.

In using the regenerator 230, the controller 170 may instruct the switching between fuel and fresh air flow between the two chambers 241, 242 through one of three different techniques. In a first technique, a sensor S is connected to the exit of the first sorption chamber 241 such that when the inlet and outlet liquid streams have an equal aromatic content as detected by sensor S (which in turn provides indicia of saturation in that no additional changes in the aromatic concentration are occurring), the controller 170 in response to such an acquired signal switches the market fuel that is being delivered from the fuel supply tank 220 to the second sorption chamber 242. In a second technique, a timer is connected to the controller 170 to allow it to open and close at certain time intervals (for example every 15 minutes) where the time intervals depend on the absorbent size and rate of the adsorption. In a third technique, sensor S may be a temperature sensor such that once the temperature at the respective sorption chamber 241, 242 is no longer increasing (which in turn provides indicia of no further heat release due to adsorption), the controller 170 switches the fuel flow from the first sorption chamber 241 to the second sorption chamber 242.

With particular regard to the partial bypass operational condition mentioned previously, in certain operational conditions of ICE 150 (also referred to as a first operational condition), it may be necessary for reliable operation to use an SI mode of operation, as at startup or other scenarios where there are no exhaust gases or hot radiator fluid available to heat the adsorption cycle, or where there are no high-cetane or high-octane fuels present in the enriched product tank 250. Furthermore, the fuel system 200 may employ self-automation features to allow it to adjust itself according to the driving cycle. For example, at the beginning of a driving cycle, low RON fuel may be needed; during this operational period, the controller 170 may instruct the various components that make up the conduit 210 to route the flow of onboard fuel through the system 200 in order to leave the onboard fuel in its substantially original (that is to say, market-based) form such that no appreciable adsorption activity is undertaken. Likewise, during such early stage of the driving cycle (and related ICE 150 operation) when the low RON fuel is being used, exhaust and other ICE 150 residual heat starts to form, at which time such heat can be used to regenerate the adsorbed octane-rich portion of the onboard fuel through vaporizing the octane-rich adsorbate that collects on the adsorbent that makes up the sorption chambers 241, 242. Furthermore, in situations where there is sufficient exhaust heat being generated by ICE 150 operation, the absorption and regeneration will be at their full capacities; otherwise, the fuel system 200 can be made to work at a partial load using as much heat as is available to provide octane-rich and cetane-rich fuel components. In this way, the fuel stream that is being conveyed from the first compartment 222 of fuel supply tank 220 is usually fed to the separation unit 240 where it is acted upon, except in those ICE 150 operating regimes where there is an inadequate amount of exhaust, residual or otherwise supplemental heat with which to promote the regeneration of adsorbed portions of such onboard fuel. Furthermore, the partial bypass avoids otherwise undesirable latency periods associated with sudden driving conditions associated with speed or load, as well as those related to weather conditions. In such a partial bypass operational condition, the controller 170 may instruct a fraction of the market fuel from fuel supply tank 220 to be supplied directly to the combustion chamber 156, without entering the separation unit 240. This fraction can be controlled and manipulated via different methods such as temperature of the coolant or exhaust gas, level of separated fuels, time or other variables. Two examples are presented to highlight the benefits associated with partial bypass operation.

First, during startup of ICE 150 when no heat is available to operate adsorption cycle and no fuel fractions are available, the controller 170 works together so that fuel flow may partially come from the LON fuel component that is contained within the enriched product tank 250, while the main fuel portion comes from the fuel supply tank 220. If either of the enriched product tank 250 or the second and third compartments 224, 226 of the fuel supply tank 220 is empty at any time (such as that associated with unexpected driving cycle conditions, lack of heating needed for desorption or insufficient air cooling), the controller 170 may instruct one or more fuel pumps 260 (only one of which is shown) to pressurize the market fuel being delivered from the fuel supply tank 220 directly to the combustion chamber 156 as a way to at least partially bypass the separation unit 240 to compensate for the shortage in the cetane-enriched product tank 250 or the second and third compartments 224, 226 of the fuel supply tank 220.

Significantly, the fuel system 200 is designed to avoid using supplemental equipment, instead utilizing components that are already operating for other purposes, such as a fan (not shown) that moves ambient air for cooling during the adsorption step, and the fuel pump 260 (although even equipment like this may be reduced, simplified or eliminated in situations where common rail fuel injection may be used). In one form, the fuel injection pressures generated by the fuel system 200 may be up to about 500 bar for gasoline direct injection, and up to about 2500 bar for common rail diesel injection where this higher injection pressure is used to expand the operating region of diesel-based CI engines in that it facilitates premixed CI combustion. In so doing, this latter pressure increase for diesel fuel-based engines may offset the needed robustness of construction and reductions in compression ratio and fuel ignition delay. As mentioned previously, the fuel system 200 takes significant advantage of latent heat associated with normal ICE 150 operation to perform its vaporization (that is to say, desorption) activities in the separation unit 240.

Figure 4:
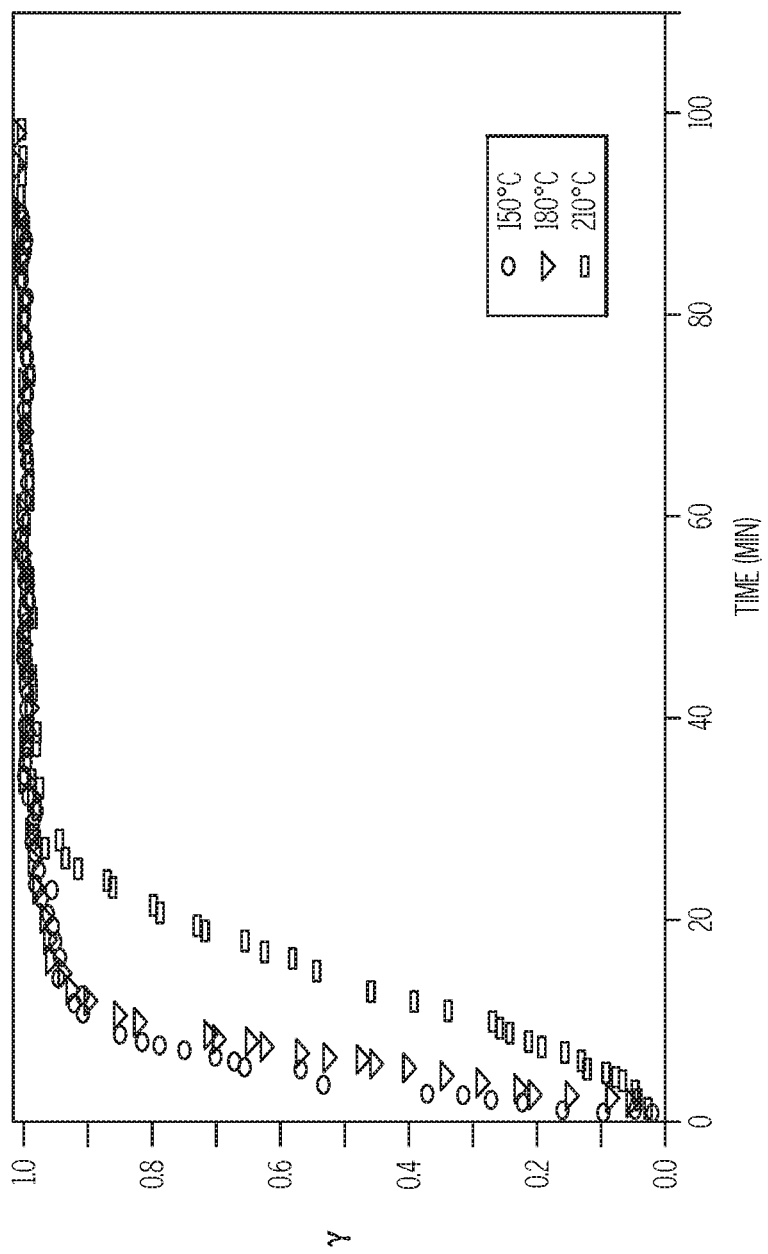
FIG. 4 illustrates an adsorption rate of a highly aromatic fuel compound on a particular adsorbent functional group that may be used in the onboard fuel separation system of FIG. 3.

Referring next to FIG. 4, an example is provided to demonstrate the applicability of the proposed method and system with particular emphasis on small adsorbent size and fast adsorption rate y for three different temperatures of 150° C., 180° C. and 210° C. for a 1000 cc zeolite adsorbent sample with a Y-based framework; this size was chosen because it was deemed to be compatible with vehicular-based applications. In particular, the employed adsorbent is zeolite NaY with a geometric volume of $\alpha$-cages (0.294 cc/g) and $\beta$-cages (0.054 cc/g). The adsorption capacity of various aromatic molecules that are present in a commercially-available gasoline-based market fuel for this type of adsorbent is shown in Table 2.

TABLE 2

| Aromatic Component | Adsorption Capacity (ml/g NaY) | Adsorption Capacity (ml/cm³ NaY) |
|---|---|---|
| Benzene | 0.29 | 0.4 |
| Toluene | 0.28 | 0.39 |
| m-Xylene | 0.28 | 0.39 |
| Mesitylene | 0.21 | 0.3 |
| Average | 0.265 | 0.37 |

Despite the fact that adsorption of aromatics using Y-based zeolites tends to be a relatively slow process, there is no need to wait for full equilibrium as many of the aromatic species contained within the market fuel reach a saturation level much more quickly. For example, toluene is adsorbed and reaches equilibrium within 20 minutes, with substantially complete equilibrium occurring after about 1.0 to 1.7 hours. Moreover as shown, the adsorption rate y increases with temperature. This permits the adsorbate rate over the adsorption cycle to be easily estimated. Significantly, it demonstrates that various enriched fuel components can be produced in a timely manner using adsorption-based equipment with heat exchange componentry that can meet the relatively small volumetric requirements needed for placement within a vehicular package, particularly for compact and smaller passenger versions of vehicle 100.

Figure 5:
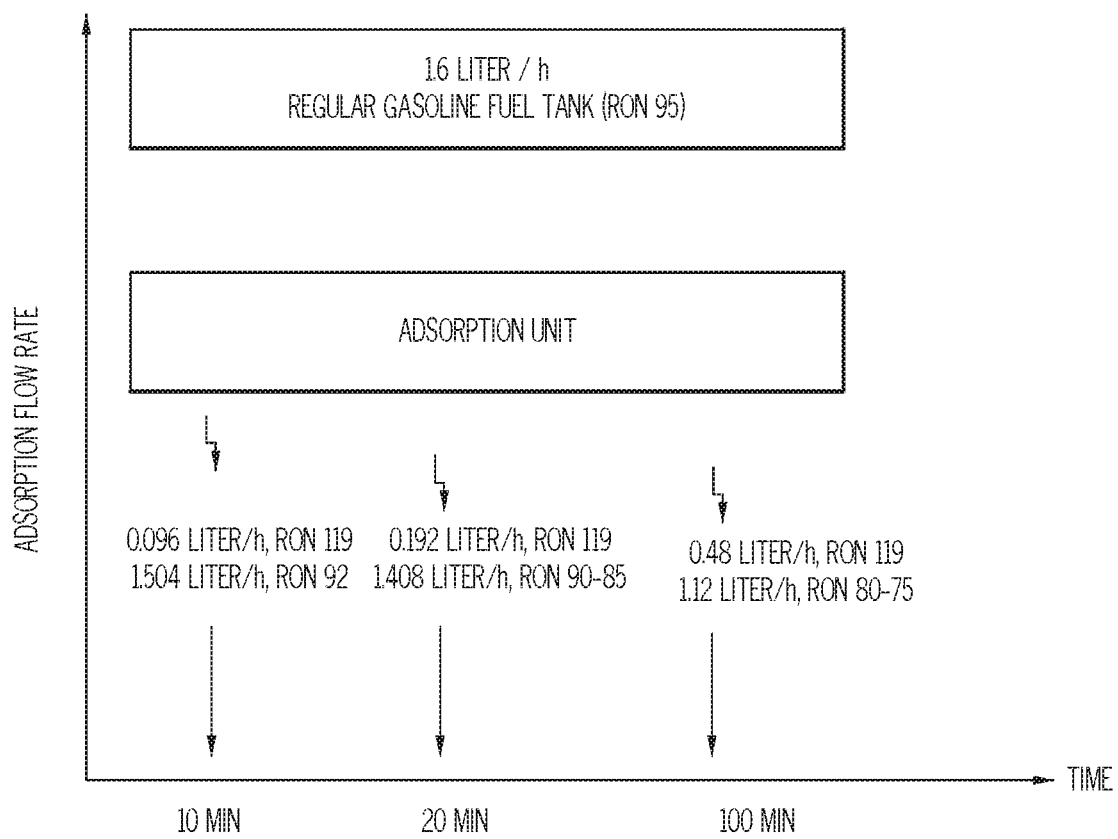
FIG. 5 illustrates an exemplary adsorbate flow rate under three separate time periods in accordance with one or more embodiments shown or described.

Referring next to FIG. 5, the amount of octane-enriched fuel that can be separated onboard by fuel system 200 that uses the zeolite-based adsorbent with the properties set forth in previously-discussed Table 2 and following Table 3 in the reactant chambers 241, 242 is shown. By way of one example, vehicle 100 may be configured as a passenger vehicle that consumes 6 liters of fuel per 100 kilometers averaging consumption over city and the highway distances and running at an average speed of 70 kilometers/hour; in such case, gasoline demand may be typically 4.5 liters/hour.

By way of another example, vehicle 100 may be configured as a compact vehicle that consumes 1.6 liters/hour of 95 RON gasoline that includes 30% aromatics consumed at the rate of 0.48 liters/hour. More particularly, the aromatic molecules include toluene (0.192 liters/hour), xylene (0.192 liters/hour), benzene (0.048 liters/hour) and mesitylene (0.048 liters/hour). The adsorbate amount is shown for three notional cycle times of 10 minutes, 20 minutes and 100 minutes for a 1000 cc Y-based zeolite adsorber. When this fuel stream passes through the adsorbent bed that is formed on each of the reactant chambers 241, 242, aromatic molecules separate and attract to the adsorbent particles at different rates depending on the molecule shape, size or the like.

After only 10 minutes of operation, 6% of the regular gasoline separates as high-octane gasoline with a 119 RON. Likewise, after only 20 minutes, 12% of the regular gasoline separates into the 119 RON gasoline, whereas complete equilibrium is attained after 160 minutes. The results indicate that adsorption-based OOD can be employed for onboard applications in terms of the system size and operation time.

TABLE 3

| Time (min) | Flow (l/h) | Adsorbate RON | Composition | Unadsorbed fuel flow (l/h) | Un-adsorbed fuel RON |
|---|---|---|---|---|---|
| 0 | 0 | 0 | | 1.6 | 95 |
| 10 | 0.096 | 119 | 0.5 toluene | 1.504 | 92 |
| 20 | Min 0.192 (all toluene) | 119 | Toluene plus other aromatics | 1.408 | 85-90 |
| 100 | 0.48 | 100-120 | All aromatics | 1.12 | 75-80 |

Having described the subject matter of the present disclosure in detail and by reference to specific embodiments, it is noted that the various details disclosed in the present disclosure should not be taken to imply that these details relate to elements that are essential components of the various described embodiments, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified as preferred or particularly advantageous, it is contemplated that the present disclosure is not necessarily limited to these aspects.

It is noted that one or more of the following claims utilize the term "wherein" as a transitional phrase. For the purposes of defining features discussed in the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It is noted that terms like "preferably", "generally" and "typically" are not utilized to limit the scope of the claims or to imply that certain features are critical, essential, or even important to the disclosed structures or functions. Rather, these terms are merely intended to highlight alternative or additional features that may or may not be utilized in a particular embodiment of the disclosed subject matter. Likewise, it is noted that the terms "substantially" and "approximately" and their variants are utilized to represent the inherent degree of uncertainty that may be attributed to any quantitative comparison, value, measurement or other representation. As such, use of these terms represents the degree by which a quantitative representation may vary from a stated reference without resulting in a change in the basic function of the subject matter at issue.

It will be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

What is claimed is:

1. A vehicular propulsion system comprising:
   an internal combustion engine comprising a combustion chamber; and
   a fuel system configured to provide fuel to the combustion chamber, the fuel system comprising:
      a fuel supply tank configured to contain an onboard supply of fuel, the fuel supply tank comprising a heat exchanger comprising at least a first compartment for containing the onboard fuel and a second compartment disposed within the first compartment;

a separation unit in fluid communication with the fuel supply tank and comprising at least one adsorbent-based chamber to selectively receive and separate at least a portion of the onboard supply of fuel into a plurality of components comprising either (a) an octane-rich adsorbate and a cetane-rich remainder or (b) a cetane-rich adsorbate and an octane-rich remainder; and a product tank in fluid communication with the separation unit for selectively receiving and containing the remainder, wherein the fuel supply tank and separation unit are thermally and fluidly cooperative with one another such that a desorbate produced by a regenerative operation of the separation unit upon the octane-rich or cetane-rich adsorbate is received by the second compartment in order to have at least a portion of excess heat that has been imparted to the desorbate through the regenerative operation removed by an onboard supply of fuel contained within the first compartment.

2. The vehicular propulsion system of claim 1, wherein the fuel system is configured such that the onboard supply of fuel is not preheated prior to being conveyed to the separation unit.

3. The vehicular propulsion system of claim 1, wherein the heat exchanger of the fuel supply tank further comprises a third compartment thermally and fluidly cooperative with the second compartment in order to have the third compartment fluidly receive at least a portion of any remaining portion of the desorbate from the second compartment.

4. The vehicular propulsion system of claim 3, wherein the third compartment is nested within an internal volume defined by the second compartment.

5. The vehicular propulsion system of claim 3, wherein the third compartment comprises a plurality of individual tubes at least some of which are open at both ends.

6. The vehicular propulsion system of claim 1, wherein the first and second compartments are configured such that the onboard supply of fuel that is present in the first compartment and the desorbate that is present in the second compartment are in fluid communication with one another solely through the separation unit.

7. The vehicular propulsion system of claim 1, further comprising:
a plurality of sensors that are configured to acquire at least one operational parameter associated with the internal combustion engine and the fuel system; and
a controller cooperative with the internal combustion engine, sensors and fuel system and configured to (a) determine an operational condition of the internal combustion engine based on at least one sensed parameter from at least one of the plurality of sensors that are associated with the operation of the internal combustion engine, and (b) adjust delivery of at least one of the onboard fuel, the desorbate and the remainder to the combustion chamber in response to such determined operational condition.

8. The system of claim 1, wherein the at least one adsorbent-based chamber comprises a plurality of stages such that a first stage preferentially adsorbs at least one octane-rich compound through the use of an affinity-based adsorbent while the second stage preferentially adsorbs at least one cetane-rich compound through the use of a size-selective adsorbent.

9. A method of providing fuel to an internal combustion engine, the method comprising:
configuring a fuel system to comprise a fuel supply tank with an onboard fuel being disposed in a first compartment of the fuel supply tank, a separation unit and a product tank cooperative with one another through fuel conduit and responsive to directions provided by a controller;
using the controller to ascertain an operational condition of the internal combustion engine; and
using the controller to either direct the flow of a portion of the onboard fuel to either (a) a combustion chamber of the internal combustion engine without first passing through the separation unit when the engine is in a first operational condition or (b) the separation unit when the engine is in a second operational condition such that an adsorbate in the form of one of an octane-rich fuel component and a cetane-rich fuel component collects on a surface of at least one chamber of the separation unit, while a remainder of the portion of the onboard fuel is directed to product tank for storage as the other of the cetane-rich fuel component and the octane-rich fuel component, wherein using the controller to direct the flow of a portion of the onboard fuel to the separation unit comprises:
having the separation unit perform a regenerative operation to create a desorbate from at least a portion of the octane-rich or cetane-rich adsorbate;
having the desorbate be conveyed from the separation unit to a second compartment that is disposed within the first compartment of the fuel supply tank;
having at least a portion of the desorbate within the second compartment be condensed by an exchange of heat with the onboard fuel that is present in the first compartment; and
conveying at least one of (a) the desorbate that is present in the second compartment and (b) the remainder that is in the product tank to the combustion chamber.

10. The method of claim 9, wherein the internal combustion engine is operated in a compression ignition mode.

11. The method of claim 10, wherein the compression ignition mode comprises operating as gasoline compression ignition.

12. The method of claim 9, wherein the internal combustion engine is operated in a spark ignition mode.

13. The method of claim 9, wherein using the controller to direct the flow of a portion of the onboard fuel to the separation unit further comprises conveying the desorbate that is present in the second compartment to a third compartment prior to conveying the desorbate to the combustion chamber, the third compartment configured such that it is fluidly and thermally cooperative with the second compartment such that at least a portion of the desorbate within the second compartment that is conveyed to the third compartment is condensed by an exchange of heat between the second and third compartments.

14. The method of claim 9, wherein using the controller to ascertain an operational condition of the internal combustion engine comprises determining an operational condition of the internal combustion engine based on at least one sensed parameter associated with the operation thereof.

15. A fuel system for an internal combustion engine, the fuel system comprising:
a fuel supply tank configured to contain an onboard supply of fuel, the fuel supply tank comprising a heat exchanger comprising at least a first compartment for containing the onboard fuel and a second compartment disposed within the first compartment;

a separation unit in fluid communication with the fuel supply tank and comprising at least one adsorbent-based chamber to selectively receive and separate at least a portion of the onboard supply of fuel into a plurality of components comprising either (a) an octane-rich adsorbate and a cetane-rich remainder or (b) a cetane-rich adsorbate and an octane-rich remainder;

a product tank in fluid communication with the separation unit for selectively receiving and containing the remainder, wherein the fuel supply tank and separation unit are thermally and fluidly cooperative with one another such that a desorbate produced by a regenerative operation of the separation unit uon the octane-rich or cetane-rich adsorbate and that is received by the second compartment in order to have at least a portion of excess heat that has been imparted to the desorbate through the regenerative operation removed by an onboard supply of fuel contained within the first compartment; and a controller configured to (a) determine an operational condition of an internal combustion engine based on at least one sensed parameter associated with the operation thereof, and (b) adjust delivery of at least one of the onboard fuel, the desorbate and the remainder to a combustion chamber within the internal combustion engine in response to such determined operational condition.

16. The fuel system of claim 15, wherein the heat exchanger of the fuel supply tank further comprises a third compartment thermally and fluidly cooperative with the second compartment in order to have the third compartment fluidly receive at least a portion of any remaining portion of the desorbate from the second compartment.

17. The fuel system of claim 15, wherein the controller being configured to adjust delivery of at least one of the onboard fuel, the desorbate and the remainder to a combustion chamber within the internal combustion engine in response to such determined operational condition is further configured to adjust at least one of (a) the timing of such delivery to the combustion chamber in response to such determined operational condition and (b) the concentration of at least one of the onboard fuel, desorbate and remainder to the combustion chamber in response to such determined operational condition.

* * * * *

UNITED STATES PATENT AND TRADEMARK OFFICE
CERTIFICATE OF CORRECTION

PATENT NO. : 10,598,100 B2
APPLICATION NO. : 16/452870
DATED : March 24, 2020
INVENTOR(S) : Esam Zaki Hamad et al.

Page 1 of 1

It is certified that error appears in the above-identified patent and that said Letters Patent is hereby corrected as shown below:

In the Specification

In Column 21, Line(s) 24, delete "y" and insert --$\gamma$--, therefor.

Signed and Sealed this
Fourteenth Day of July, 2020

Andrei Iancu
*Director of the United States Patent and Trademark Office*